US009292418B2

(12) United States Patent
Sridharan et al.

(10) Patent No.: US 9,292,418 B2
(45) Date of Patent: Mar. 22, 2016

(54) DETERMINING THE VULNERABILITY OF MULTI-THREADED PROGRAM CODE TO SOFT ERRORS

(71) Applicant: Advanced Micro Devices, Inc., Sunnyvale, CA (US)

(72) Inventors: Vilas Sridharan, Brookline, MA (US); Mark E. Wilkening, Westford, MA (US); Sudhanva Gurumurthi, Watertown, MA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 0 days.

(21) Appl. No.: 14/266,131

(22) Filed: Apr. 30, 2014

(65) Prior Publication Data

US 2014/0331207 A1    Nov. 6, 2014

Related U.S. Application Data

(60) Provisional application No. 61/818,351, filed on May 1, 2013.

(51) Int. Cl.
*G06F 9/44* (2006.01)
*G06F 11/36* (2006.01)
*G06F 11/34* (2006.01)
*G06F 9/48* (2006.01)

(52) U.S. Cl.
CPC .......... *G06F 11/3672* (2013.01); *G06F 9/4843* (2013.01); *G06F 11/34* (2013.01); *G06F 11/3471* (2013.01); *G06F 11/3612* (2013.01)

(58) Field of Classification Search
CPC ........................................ G06F 11/34–11/3696
See application file for complete search history.

(56) References Cited

U.S. PATENT DOCUMENTS

| 7,849,387 B2 * | 12/2010 | Biswas et al. ................. 714/799 |
| 8,352,921 B2 * | 1/2013 | Jegoulev ................. G06F 8/437 717/128 |
| 8,356,285 B2 * | 1/2013 | Schuba ............... G06F 9/45558 717/127 |
| 8,645,923 B1 * | 2/2014 | Satish ..................... G06F 21/52 717/131 |
| 2002/0199175 A1 * | 12/2002 | Saulsbury ..................... 717/141 |
| 2006/0150163 A1 * | 7/2006 | Chandane ........... G06F 11/3612 717/131 |
| 2007/0079290 A1 * | 4/2007 | Roth .................... G06F 11/3668 717/124 |
| 2007/0079291 A1 * | 4/2007 | Roth .................... G06F 11/3668 717/124 |

(Continued)

OTHER PUBLICATIONS

Walcott, Kristen R., et al., "Dynamic Prediction of Architectural Vulnerability from Microarchitectural State", 2007, pp. 516-527.*
Soundararajan, Niranjan, et al., "Characterizing the Soft Error Vulnerability of Multicores Running Multithreaded Applications", 2010, pp. 379-380.*
Zhang, Wangyuan, et al., "An Analysis of Microarchitecture Vulnerability to Soft Errors on Simultaneous Multithreaded Architectures", 2007, pp. 169-178.*
Gold, Brian T., et al., "Mitigating Multi-bit Soft Errors in L1 Caches Using Last-Store Prediction", 2007, pp. 1-8.*
Pan, Songjun et al., "IVF: Characterizing the Vulnerability of Microprocessor Structures to Intermittent Faults", 2010, pp. 238-243.*
Duan, Lide et al., "Predicting Architectural Vulnerability on Multithreaded Processors under Resource Contention and Sharing", 2013, pp. 114-127.*

*Primary Examiner* — Thuy Dao
*Assistant Examiner* — Christopher Franco
(74) *Attorney, Agent, or Firm* — Park, Vaughan, Fleming & Dowler LLP

(57) ABSTRACT

The described embodiments include a program code testing system that determines the vulnerability of multi-threaded program code to soft errors. For multi-threaded program code, two to more threads from the program code may access shared architectural structures while the program code is being executed. The program code testing system determines accesses of architectural structures made by the two or more threads of the multi-threaded program code and uses the determined accesses to determine a time for which the program code is exposed to soft errors. From this time, the program code testing system determines a vulnerability of the program code to soft errors.

14 Claims, 3 Drawing Sheets

(56) References Cited

U.S. PATENT DOCUMENTS

| | | | |
|---|---|---|---|
| 2007/0220366 A1* | 9/2007 | Bose et al. | 714/47 |
| 2007/0250820 A1* | 10/2007 | Edwards | G06F 11/3636 717/131 |
| 2009/0113240 A1* | 4/2009 | Vera et al. | 714/17 |
| 2009/0249301 A1* | 10/2009 | Kalla | G06F 11/3668 717/127 |
| 2011/0072303 A1* | 3/2011 | Hoogerbrugge | 714/10 |
| 2011/0296242 A1* | 12/2011 | Elnozahy et al. | 714/26 |
| 2014/0281740 A1* | 9/2014 | Casado et al. | 714/47.2 |
| 2014/0331207 A1* | 11/2014 | Sridharan et al. | 717/124 |

* cited by examiner

DETERMINING THE VULNERABILITY OF MULTI-THREADED PROGRAM CODE TO SOFT ERRORS

RELATED APPLICATION

This application is a non-provisional application from, and hereby claims priority to, U.S. provisional patent application No. 61/818,351, which was filed on 1 May 2013 and which is incorporated by reference.

GOVERNMENT LICENSE RIGHTS

This invention was made with Government support under prime contract number DE-AC02-05CH11231, fixed price subcontract number 7078426 awarded by the DOE. The Government has certain rights in this invention.

BACKGROUND

1. Field

The described embodiments relate to computing devices and program code that executes thereon. More specifically, the described embodiments relate to determining the vulnerability of program code to soft errors in computing devices.

2. Related Art

Computing devices typically include circuits (e.g., integrated circuits, etc.) that are susceptible to "soft errors." Soft errors occur when data in a circuit changes due to an event such a high-energy particle impacting the circuit, electromagnetic noise effects, etc. For example, a neutron from a cosmic ray may impact a circuit and change a logical "1" (or high voltage value) stored in the circuit to a logical "0" (or low voltage value) or vice versa. Program code (e.g., applications, operating systems, firmware, etc.) executed by such a computing device can encounter errors when soft errors occur in architectural structures in the computing device that are being accessed by the program code. For example, program code can encounter an error when a logical value for a bit stored in a register or at a memory location in the computing device changes due to a soft error and the erroneous value is read and used by the program code.

In order to determine program codes' vulnerability soft errors, designers have created program code testing mechanisms. These existing program code testing mechanisms are configured to determine the vulnerability of individual/single threads of execution in program code to soft errors. For example, one such program code testing mechanism models individual threads in program code as a sequence of instructions and determines the vulnerability of the individual thread to soft errors based on the sequence of instructions. However, existing program code testing mechanisms do not determine the vulnerability to soft errors of multi-threaded program code, e.g., applications, operating system routines, etc. for which two or more threads separately perform accesses to shared architectural structures. Because the vulnerability of program code to soft errors is potentially different when two or more threads of multi-threaded program code separately perform accesses to shared architectural structures, existing program code testing mechanisms do not completely characterize program codes' vulnerability to soft errors.

BRIEF DESCRIPTION OF THE FIGURES

Throughout the figures and the description, like reference numerals refer to the same figure elements.

DETAILED DESCRIPTION

Figure 1:
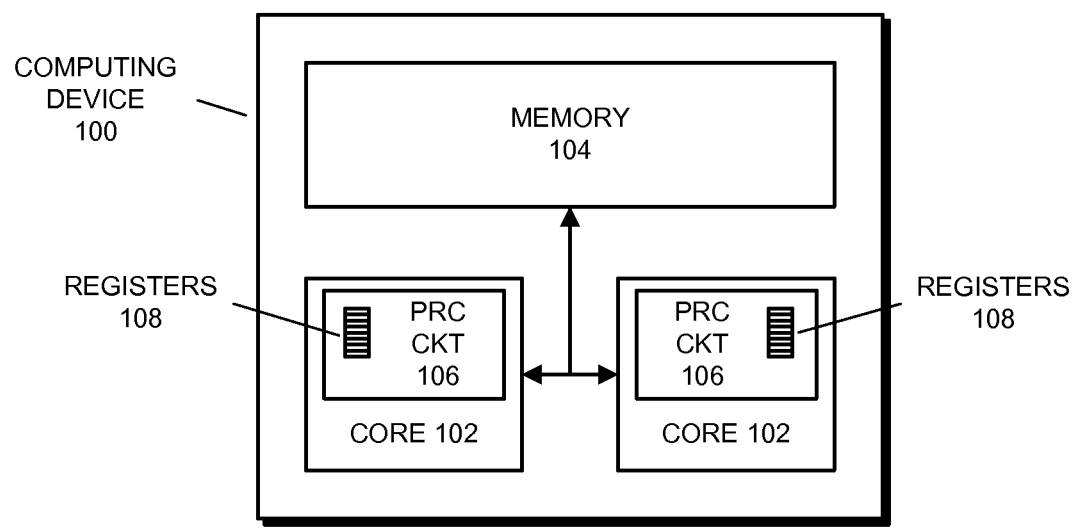
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Terminology

In the following description, various terms may be used for describing embodiments. The following section provides a simplified and general description of some of these terms. Note that some or all of the terms may have significant additional aspects that are not recited herein for clarity and brevity and thus these descriptions are not intended to limit the terms.

Program code: program code is computer-executable code configured to be executed in a computing device (e.g., compiled/linked, interpreted, etc.) such as applications, operating systems, scripts, applets, routines/methods, firmware, etc., and/or some portion or combination thereof. When executed by a computing device, program code causes the computing device to perform corresponding operation(s). For example, program code for a word processing application causes a computing device to perform operations for the word processing application. As another example, program code for a routine within an operating system causes the computing device to perform corresponding operations for the routine.

Multi-threaded program code: multi-threaded program code is program code that includes two or more threads of execution that perform operations for the program code. For example, if the program code is for a media player application, the program code may include multiple threads for performing operations for the media player application. For such program code, the multiple threads may be executed in tandem by a computing device that is executing the program code. For example, in some embodiments, the computing device executes the two or more threads concurrently on separate processor cores, switches the two or more threads in and out of active execution on a single processor core (such as with time-division multiplexing), and/or otherwise contemporaneously executes the two or more threads.

Architectural structures: in computer architecture, an instruction set architecture (ISA) specifies various aspects of program code's interaction with a computing device upon which the program code is executed. For example, in some embodiments, an ISA specifies aspects such as data types, instructions, registers, addressing modes, memory architecture, etc. Architectural structures are structures such as registers, memories, etc. that are specified by an ISA to be available for use by program code. For example, the ISA may specify the number and purpose for each register in a set of registers that is available for use by the program code for performing computational operations.

Soft error: soft errors are errors that occur when data in a circuit (e.g., an integrated circuit) in a computing device changes state due to an event such a high-energy particle impacting the circuit, electromagnetic noise, and/or other environmental or mechanical effects. For example, a neutron from a cosmic ray may impact a circuit and change a logical "1" (or high voltage value) stored in the circuit to a logical "0" (or low voltage value) or vice versa. Program code executed by a computing device can encounter errors when soft errors occur in architectural structures in the computing device that are being accessed by the program code. For example, program code can encounter an error when a logical value for a bit stored in a register or at a memory location in the computing device changes due to a soft error and the erroneous value is read and used by the program code. Generally, the chance of program code being effected by a soft error increases in proportion to the length of time data is held in an architectural structure before being read and used by the program code.

Overview

The described embodiments include a program code testing system that determines the vulnerability of multi-threaded program code to soft errors. For multi-threaded program code, two to more threads from the program code may access (i.e., read, write, and/or otherwise change and/or use data from) architectural structure(s) while the program code is being executed. The program code testing system determines accesses of architectural structures made by the two or more threads of the multi-threaded program code and uses the determined accesses to determine a time for which the program code is exposed to soft errors. From this time, the program code testing system determines a vulnerability of the program code to soft errors.

In some embodiments, when determining the vulnerability of multi-threaded program code to soft errors, a computing device (e.g., a computing device performing operations for the program code testing system) first receives the program code, the program code including corresponding instructions for each of two or more threads. The computing device then analyzes the instructions for each thread to determine instructions that access architectural structures and the nature of the accesses made by the instructions. Based on this analysis, the computing device identifies instructions from each thread that perform critical accesses of the architectural structures (critical accesses are described in more detail below). The computing device then executes the program code. For the execution of the program code, the computing device determines times when the identified instructions perform the critical accesses of the architectural structures and uses these times to determine periods of time when the architectural structures hold data that is accessed by one or more of the identified instructions. These periods of time are periods of time when the program code is exposed to soft errors. Based on the determined periods of time, the computing device determines the overall vulnerability of the program code to soft errors.

By determining the times when the identified instructions from each of the two or more threads perform critical accesses to the architectural structures as described above, the described embodiments account for the relative timing of critical accesses performed by all of the two or more threads when determining the vulnerability of the multi-threaded program code to soft errors. This stands in contrast to existing program code testing mechanisms, which are limited to testing individual/single threads for vulnerability to soft errors.

By providing an improved understanding of the vulnerability of multi-threaded program code to soft errors, these embodiments enable software developers, system architects, and others to design computer systems and multi-threaded program code that are less susceptible to the effects of soft errors.

Computing Device

FIG. 1 presents a block diagram illustrating computing device 100 in accordance with some embodiments. Computing device 100 includes two processor cores 102 and a memory 104.

Processor cores 102 (shown as "CORE 102" in FIG. 1) are functional blocks that perform computational operations in computing device 100. Each of processor cores 102 includes a central processing unit (CPUs)/CPU core, graphics processing unit (GPU)/GPU core, an embedded processor, an application specific integrated circuit (ASIC), and/or another computational mechanism. In some embodiments, processing operations (e.g., instruction execution, etc.) for a processor core 102 are performed in corresponding processing circuits 106 (shown as "PRC CKT 106" in FIG. 1) (e.g., in an instruction-processing pipeline, in a compute unit, etc.). Processing circuits 106 include registers 108, which include register circuits used to hold data for operations by processing circuits 106.

Memory 104 is a functional block that stores data and/or instructions for use by other functional blocks in computing device 100 (e.g., processor cores 102). Memory 104 includes volatile memory circuits such as dynamic random access memory (DRAM), static random access memory (SRAM), and/or other types of memory that are used for storing the instructions and data, as well as mechanisms for controlling the memory circuits.

In some embodiments, communication paths (that include one or more buses, wires, and/or connections) are coupled between the functional blocks in computing device 100 (processor cores 102, memory 104, etc.), as shown by arrow-headed lines between the elements. The communication paths are used to transmit commands, data, and/or other information between the elements.

Although certain functional blocks are used to describe computing device 100, in some embodiments, a different arrangement of functional blocks are present in computing device 100. For example, computing device 100 may include one, three, or another number of processor cores 102, etc. In addition, in some embodiments, computing device 100 may include one or more additional functional blocks that are not shown in FIG. 1. For example, computing device 100 may include a data collection subsystem, an audio and/or video subsystem, an alarm subsystem, a display subsystem, a media processing subsystem, and/or an input/output (I/O) subsystem.

Computing device 100 can be, or can be included in, any device that performs computational operations. For example, computing device 100 can be, or can be included in, a desktop computer, a laptop computer, a wearable computing device, a tablet computer, a smart phone, a server, a network appliance, audio-visual equipment, an automobile, a home appliance, a controller, etc., and/or combinations thereof.

Instruction Set Architecture and Microarchitecture

In some embodiments, computing device 100 is designed for and program code is configured for (i.e., compiled/linked, written, etc.) a particular instruction set architecture (ISA). For example, in some embodiments, computing device 100 is designed for and the program code is configured for the x86 ISA from Intel, inc. of Santa Clara, Calif. Generally, the ISA for which computing device 100 is designed and the program code is configured includes a specification of various architectural structures, such as registers and memory.

In some embodiments, the microarchitecture of computing device 100, while meeting the specification of the ISA, does not exactly match the ISA. For example, in some embodiments, while the ISA specifies a particular arrangement of architectural registers (i.e., a certain number of registers, each with specified functions), each processor core 102 includes processing circuits 106 with registers 108 that include one or more registers used to perform each function of the architectural registers specified in the ISA. In these embodiments, the processor cores 102 may include a set or pool of registers 108 that can each be temporarily assigned to perform the function of an architectural register for an instruction/operation. As another example, in some embodiments, while the ISA specifies an address space of a particular size (e.g., a 64-bit address space that is $2^{64}$ addresses in size), memory 104 does not include sufficient memory circuits to simultaneously hold data at all of the addresses from the ISA. Instead, memory 104 has sufficient memory circuits to simultaneously hold data of a given subset of addresses and a technique such as virtual memory is used to conceal the true size of memory 104 from program code executed by processor cores 102.

In this description, the term "architectural structures" indicates the corresponding structures specified in the ISA, i.e., as expected and used by the program code. For example, the program code may perform an access of a register specified in the ISA. However, as described above, the access may be handled, translated, processed, or modified by processor core 102 to direct the access to appropriate microarchitectural structures (i.e., microarchitectural register) in processor core 102. By using architectural structures from the ISA, instead of relying on the corresponding structures in the microarchitecture of computing device 100, the program code testing system herein described functions without requiring an accounting for or understanding of the microarchitectural features of processor core 102.

Process for Determining a Vulnerability of Program Code to Soft Errors

Figure 2:
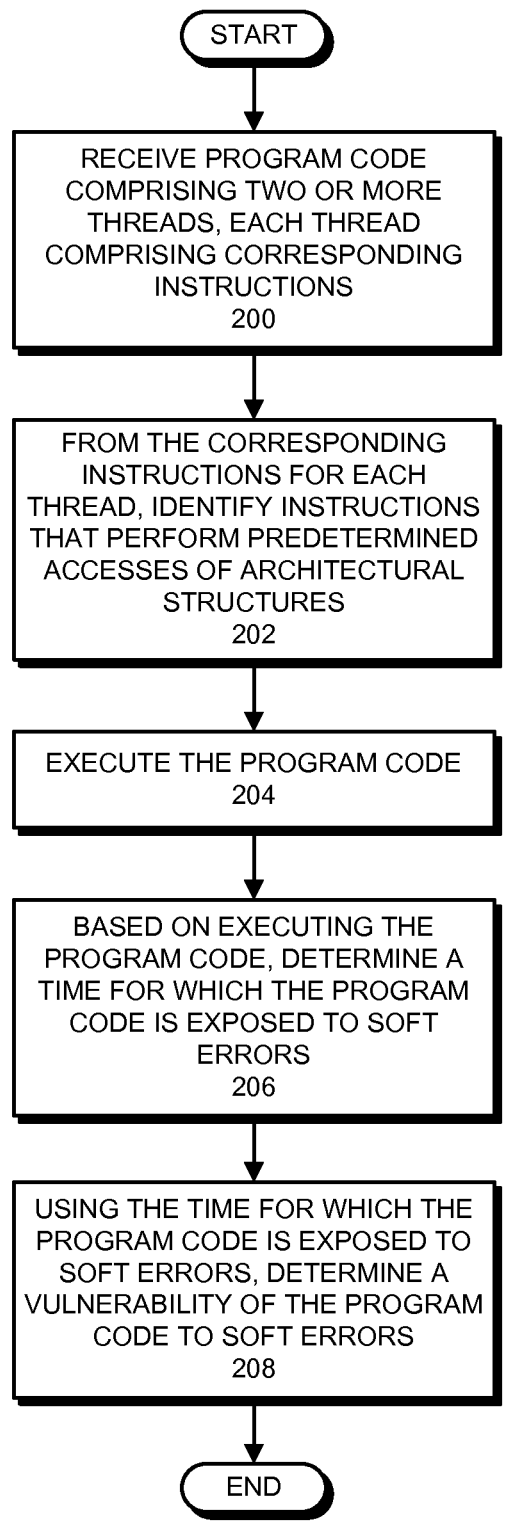
FIG. 2 presents a flowchart illustrating a process for determining the vulnerability of multi-threaded program code to soft errors in accordance with some embodiments.

FIG. 2 presents a flowchart illustrating a process for determining a vulnerability of multi-threaded program code to soft errors in accordance with some embodiments. More specifically, during the process shown in FIG. 2, computing device 100 performs operations of/for a program code testing system that makes the determination of the vulnerability of the multi-threaded program code to the soft errors. In some embodiments, a processor core 102 executes instructions for the program code testing system (e.g., acquired from a computer-readable storage medium such as memory 104, etc.), which cause the processor core 102 to perform some or all of the operations shown in FIG. 2. Note that the operations shown in FIG. 2 are presented as a general example of operations performed by some embodiments. The operations performed by other embodiments include different operations and/or operations that are performed in a different order. Additionally, although certain functional blocks are used in describing the operations (e.g., computing device 100, a processor core 102, etc.), in some embodiments, other functional blocks perform the operations.

The process shown in FIG. 2 starts when a processor core 102, while performing operations for a program code testing system, receives multi-threaded program code that includes two or more threads, each thread comprising corresponding instructions (step 200). Generally, processor core 102 can receive any kind of multi-threaded program code that can be executed by a processor core 102, from small sections of program code (i.e., a few lines of program code for each thread) to fully-featured multi-threaded applications, operating systems, etc. Within the program code, the instructions for each thread are configured to cause an executing processor core 102 to perform corresponding operations, functions, etc. for the thread.

Processor core 102 then, from the corresponding instructions for each thread, identifies instructions that perform predetermined accesses of one or more architectural structures (step 202). In some embodiments, the predetermined accesses include accesses during which: (1) data is acquired from at least one of the one or more architectural structures, and (2) the acquired data is used to perform an operation, the operation changing a state of a corresponding thread (or, more generally, the program code). In this description, such predetermined accesses are referred to as "critical accesses," because the accesses acquire data that eventually changes the state of the corresponding thread/program code.

In some embodiments, accesses during which data is acquired from at least one of the one or more architectural structures, but the data is not used to change a state of a corresponding thread and/or the program code are referred to as "non-critical accesses." For example, for some non-critical accesses, data is acquired from at least one architectural structure (e.g., a location in memory) and written into a register, but the acquired data is overwritten, erased/invalidated, discarded, etc. without being used for an operation that produces an output or otherwise changing the state of the corresponding thread and/or the program code. In some embodiments, processor core 102 identifies instructions that cause non-critical accesses as well as the predetermined accesses/critical accesses.

In some embodiments, before performing step 202 and subsequent steps, processor core 102 performs operations to identify a particular architectural structure (e.g., a register, a memory, a specific location or locations in memory, etc.) that is to be used to determine the vulnerability of program code to soft errors. In these embodiments, in contrast to the embodiments described in FIG. 2, only one (or two, three, etc.) architectural structure is analyzed as described.

In some embodiments, when identifying the instructions from the corresponding instructions for each thread that perform the predetermined accesses (step 200), processor core 102 statically analyzes the instructions for each thread to identify the instructions. For the static analysis, processor core 102 parses and evaluates the program code to identify instructions that access the architectural structure to acquire data (e.g., perform reads or loads from the architectural structure) for which one or more subsequent dependent instructions from one or more threads use/depend on the acquired data.

Note that, in some embodiments, "static" analysis indicates that the program code is not executing when processor core analyzes the instructions, and so processor core 102 (as part of the program code testing system) reads the program code and parses, extracts, processes, etc. the program code to find instructions that make the predetermined accesses. However, some embodiments dynamically analyze the code, e.g., while executing program code in step 204. In these embodiments, the accesses made by instructions to acquire data and subsequent instructions that potentially use/depend on the acquired data can be tracked in processor core 102 on the fly and used to determine when predetermined accesses are made to architectural structures.

Processor core 102 then executes the program code (step 204). When executing the program code, processor core 102 executes the instructions for each of the two or more threads subject to ordinary/expected operating conditions in processor core 102. Thus, the instructions may encounter delays in acquiring data, stalls, and/or other operating conditions that might be encountered any time that the program code is executed in processor core 102. In this way, for the subsequent operations in FIG. 2, processor core 102 acquires a natural/actual ordering of predetermined accesses that comes from executing the identified instructions (which perform the predetermined accesses) under ordinary/expected operating conditions. In other words, a natural/actual representation the timing of the operations caused by the identified instructions (and, indeed, all the corresponding instructions) for the threads in the multi-threaded program code. This natural/actual ordering of the operations caused by the identified instructions enables processor core 102 to accurately determine the time for which the program code is exposed to soft errors in step 206.

Note that, because the program code is executed as described for step 204, between two or more instances of testing the program code using the program code testing system (i.e., when operations such as operations 204-206 in FIG. 2 are performed two or more times), different times for which the code is exposed to soft errors can be determined. For example, as the program code is tested a first time (and executed as in step 204), the operations performed by each thread have a first relationship to each other (i.e., are interleaved or timed in a particular way in accordance with how the instructions for each thread were executed given delays, stalls, memory loads, processor core loads, etc. that occur as the instructions are executed for the first time). However, as the program code is tested a second time (and again executed as in step 204), the operations performed by each thread have a second relationship to each other (i.e., are interleaved or timed in a particular way in accordance with how the instructions for each thread were executed given delays, stalls, memory loads, processor core loads, etc. that occur as the instructions for each thread are executed for the second time). In this case, the first relationship (interleaving/timing) may not be the same as the second relationship, which can lead to the determination of different exposure times for the two instances of testing the program code. In some embodiments, multiple instances of running the program code testing system can be combined to arrive at an average and/or one instance can be used alone as a representative instance.

Figure 3:
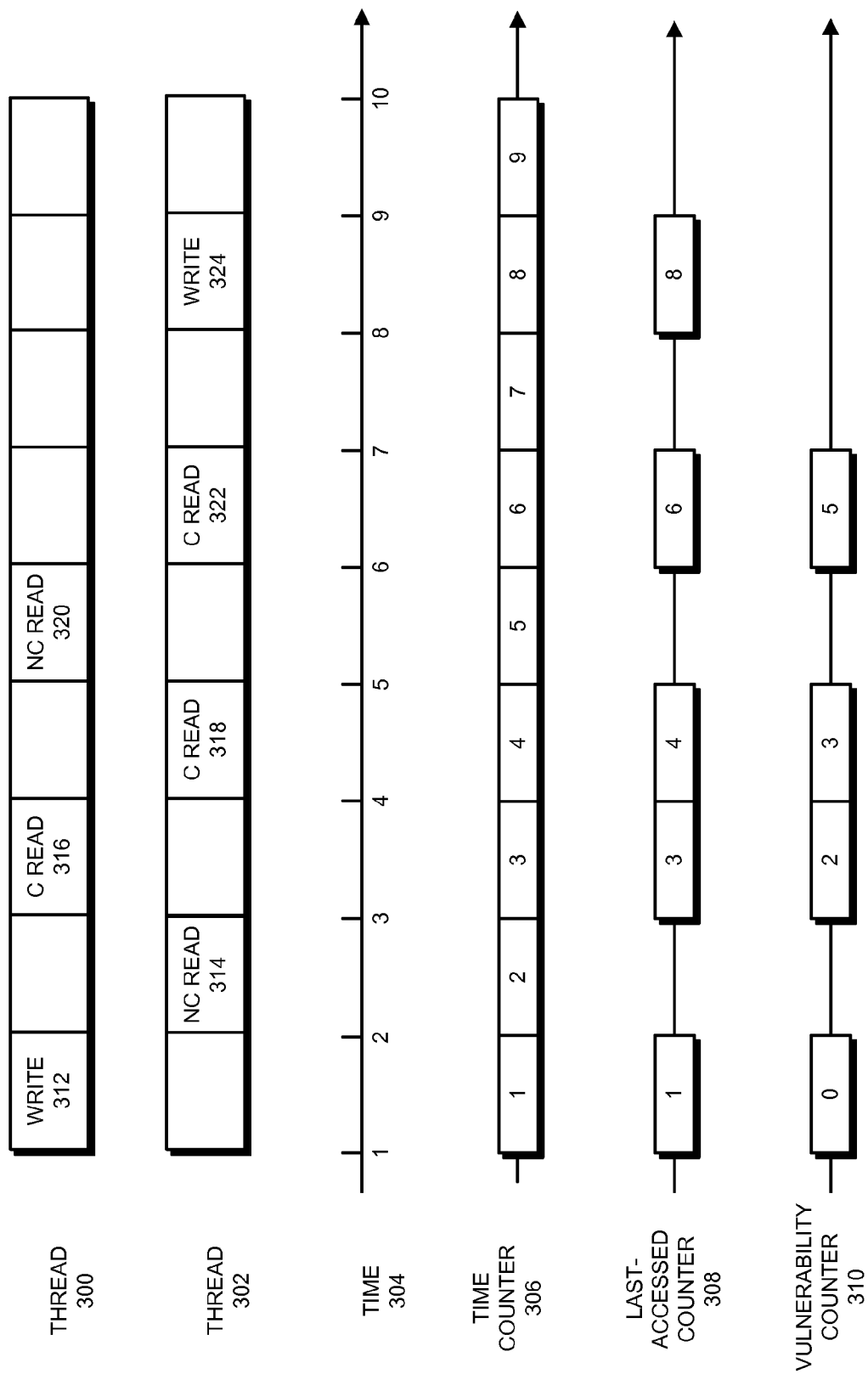
FIG. 3 presents a timing diagram illustrating operations performed while executing instructions from multi-threaded program code in accordance with some embodiments.

Based on executing the program code, processor core 102 determines a time for which the program code is exposed to soft errors (step 206). Generally, the program code is exposed to soft errors when data is held in an architectural structure (e.g., a register, a location in memory, etc.) awaiting a subsequent predetermined access (i.e., critical access) by one or more instructions from the at least one of the two or more threads. In some embodiments, step 206 comprises keeping track of a total or overall time for which the program code is exposed to soft errors. Various mechanisms for keeping track of the overall time for which the program code is exposed to soft errors may be implemented using mechanisms such as data monitors, instruction tagging/tracking, architectural structure tagging/tracking, dependency monitoring, etc. For example, in some embodiments, a set of counters such as shown in FIG. 3 is used for keeping track of the overall time for which the program code is exposed to soft errors. As another example, in some embodiments, accesses of an architectural structure (e.g., a memory) are monitored and used to determine the overall time that the program code is exposed to soft errors. In these embodiments, a write of data to the architectural structure can be used as the beginning of an exposure (to soft errors) time and a final critical access (e.g., critical read) of the written data can be used as the end of the exposure time.

Processor core 102 then uses the time for which the program code is exposed to soft errors to determine a vulnerability of the program code to soft errors (step 208). For example, processor core 102 can compute a ratio of the total execution time of the program code (which can be tracked by processor core 102 as the program code is executed) to the overall time for which the program code is exposed to soft errors and use this ratio to represent the vulnerability of the program code to soft errors. In some embodiments, the ratio is expressed as a percentage of the total execution time to which the program code is exposed to soft errors. In some embodiments, an actual "time" is not used, but instead a number of instructions is used or another metric is used.

In some embodiments, the contribution of individual threads to the vulnerability of the program code to soft errors can be identified by keeping track, in step 206, of threads that are the sources of instructions that are performing predetermined accesses. In this way, a particular thread can be identified as more (or less) susceptible to soft errors. Note that, although a particular thread is identified, the effects of the predetermined accesses by both threads are taken into account to enable the identification.

In some embodiments, after determining the vulnerability of the program code to soft errors, processor core 102 (or, more generally, computing device 100) reports the vulnerability of the program code to soft errors to a user. For example, in a user interface presented in a display of computing device 100, processor core 102/computing device 100 can report a percentage value that represents the vulnerability of the program code to soft errors.

Executing Program Code

FIG. 3 presents a timing diagram illustrating operations performed while executing instructions from multi-threaded program code in accordance with some embodiments. More specifically, in FIG. 3 a first thread 300 and a second thread 302 from multi-threaded program code (e.g., from an application) are executed by respective processor cores 102 in computing device 100 and perform various operations, including some operations for accessing an architectural structure (a memory location for this example). In some embodiments, the operations shown in FIG. 3 are performed during steps 204-208 in FIG. 2. Thus, the execution of program code and the updates of the counters shown in FIG. 3 are performed during the process for determining a vulnerability of program code to soft errors shown in FIG. 2. Note that the operations shown in FIG. 3 are presented as a general example of operations performed by some embodiments. The operations performed by other embodiments include different operations and/or operations that are performed in a different order. Additionally, although certain functional blocks are used in describing the operations (e.g., processor cores 102, etc.), in some embodiments, other functional blocks perform the operations.

As described above (in step 202), in some embodiments, before the execution of the program code shown in FIG. 3, a processor core 102 analyzes the program code and identifies instructions that perform critical accesses and non-critical accesses of architectural structures (e.g., adds a program counter for some or all of the instructions to a table, tags some or all of the instructions with a flag, tags the memory location in which some or all of the instructions are stored with a flag, etc.). For the operations shown in FIG. 3, the accesses performed by the identified instructions are indicated as critical reads (of the memory location), or "C READ" and non-critical reads (of the memory location), or "NC READ." In addition, in some embodiments, processor core 102 identifies instructions that cause updates/changes to the memory location such as writes of data to the memory location. For the operations shown in FIG. 3, writes to the memory location are indicated "WRITE."

Note that the above-described write operations change the data in the memory location, where the data is held until the data is overwritten or otherwise altered. The exposure of the program code to soft errors extends from the write of the data to a last critical access (i.e., critical read) that accesses the data written to the memory location. FIG. 3 therefore illustrates the relationship between a set of writes, critical reads, non-critical reads, and the exposure of the program code to soft errors.

For the timing diagram in FIG. 3, time proceeds from left to right as shown by the time 304 axis, with instructions executed for threads 300 and 302 contemporaneously by a respective processor core 102, so that at time 1, both thread 300 and thread 302 execute an instruction that causes a corresponding operation, which is represented by a box on the timeline for the corresponding thread. When an operation other than a write, non-critical read, or critical read is caused by an instruction executed by a thread, a blank box is presented on the timeline. For example, at time 1, thread 302 does not perform a write to the memory location, a non-critical read of the memory location, or a critical read of the memory location, so thread 302's box is blank. (At these times, the instructions executed by the threads are causing other types of operations or no operation.)

Note that "time" 1 and so forth do not indicate particular times (in the sense of an underlying clock), clock cycles, etc., but instead are references for understanding relative times when operations are performed based on threads executing instructions in processor core 102. Thus, at time 1, an operation is performed by both of threads 300 and 302 based on executing corresponding instructions, at time 2, other operations are performed, etc. In some embodiments, the vulnerability of the program code to soft errors is not computed in terms of clock or absolute time (recall that, in some embodiments, the architecture of computing device 100 is used as the model for the program code testing system, and not the microarchitecture, which is where values such as clocks, execution times, etc. are specified), but instead is computed as a proportion of an overall execution time during which the program code is exposed to soft errors. For example, a ratio of all executed instructions to the instructions for which the program code is exposed to soft errors.

During the operations shown in FIG. 3, a time counter 306, a last-accessed counter 308, and a vulnerability counter 310 are used to determine a time (or, more specifically, a proportion of execution time) for which the program code is exposed to soft errors. Time counter 306 is used to keep a record of the overall time for which the program code has been executed. Last-accessed counter 308 is used to keep a record of a last relevant access of the memory location, the last relevant access including one of a write of data to the memory location and a critical read of data from the memory location. These two counters, as described in more detail below, are used to compute updates for vulnerability counter 310, which represents a time that the program code (which includes both thread 300 and thread 302) was exposed to soft errors.

As can be seen in FIG. 3, at time 1, thread 300 executes an instruction that causes a write 312, during which data is written to the memory location. Upon the write of data to the memory location, the program code is potentially exposed to soft errors. The program code is "potentially" exposed because, in some cases, no critical reads occur between the write of the data to the memory location and a subsequent write of the memory location. In order to keep track of the program code's exposure to soft errors, processor core 102 updates a last accessed counter to 1, thereby recording when the write occurred. Processor core 102 also updates time counter 306 to 1. At time 1, the other thread, thread 302, executes an instruction that causes an operation that is not relevant for determining the exposure of the program code to soft errors.

At time 2, thread 302 executes an instruction that cases a non-critical read 314 of the memory location. Because the read is non-critical, the data read from the memory location will not be used in an operation that effects the state of thread 302 (or, more generally, the program code). Actual exposure to soft errors therefore does not occur (i.e., is not realized), despite the read of the memory location. For this reason, processor core 102 does not update last-accessed counter 308. Processor core 102 does, however, update time counter 306 to 2. At time 2, thread 300 executes an instruction that causes an operation that is not relevant for determining the exposure of the program code to soft errors.

For the remainder of the description of FIG. 3, it is assumed that processor core 102 updates time counter 306 appropriately, as shown in FIG. 3. For example, for time 3, when critical read 316 occurs, processor core 102 updates time counter to 3, etc. However, for clarity, the update operations for time counter 306 shown in FIG. 3 are not herein described.

At time 3, thread 300 executes an instruction that causes a critical read 316 from the memory location (and thread 300 executes an instruction that causes an operation that is not relevant for determining the exposure of the program code to soft errors). Because the read is critical, the data read from the memory location will be used in an operation that effects the state of thread 300 (and/or the program code). In some embodiments, processor core 102 earlier identified this instruction, so, upon executing the instruction, processor core 102 recognizes the instruction as one that performs a critical read. Because the critical read is performed, the earlier "potential" exposure to soft errors becomes an "actual" exposure to soft errors. This means that the time since write 312 occurred becomes time for which the program code was exposed to soft errors.

Upon recognizing the actual exposure to soft errors, processor core 102 increments vulnerability counter 310 with an amount of time of the exposure to the soft errors. To compute this time, processor core 102 subtracts the value of last-accessed counter 308 (1) from time counter 306 (3) to compute the amount of time of the exposure to soft errors (2). Processor core 102 then increments vulnerability counter 310 from 0 (the initial state) by the amount of time of the exposure to soft errors, 2. Next, processor core 102 updates last-accessed counter 308 to 3, thereby arriving at the updated state for the counters shown at time 3 of FIG. 3. By updating last-accessed counter 308, processor core 102 advances the time of last-accessed counter 308 to an updated time to prepare for subsequent computations of time (if any) of exposure to soft errors for any subsequent critical reads of the data written during write 312 (as the time from write 312 to critical read 316 has already been added to vulnerability counter 310).

At time 4, thread 302 executes an instruction that causes a critical read 318 from the memory location. Because the read is critical, the data read from the memory location will be used in an operation that effects the state of thread 302 (and/or the program code). In some embodiments, processor core 102 earlier identified this instruction, so, upon executing the instruction, processor core 102 recognizes the instruction as one that performs a critical read. Upon recognizing the further exposure to soft errors, processor core 102 increments vulnerability counter 310 with an amount of time of the further exposure to the soft errors. To compute this time, processor core 102 subtracts the value of last-accessed counter 308 (3) from time counter 306 (4) to compute the amount of time of the further exposure to soft errors (1). Processor core 102 then increments vulnerability counter 310 from 2 by the amount of time of the exposure to soft errors, 1—making the vulnerability counter 310 equal to 3. Next, processor core 102 updates last-accessed counter 308 to 4, thereby arriving at the updated state for the counters shown at time 4 of FIG. 3. Note that, after the updates associated with time 4, vulnerability counter 310 holds a value of 3, which reflects (so far) the total exposure to soft errors. At time 4, thread 300 executes an instruction that causes an operation that is not relevant for determining the exposure of the program code to soft errors.

At time 5, thread 300 executes an instruction that cases a non-critical read 320 of the memory location. Because the read is non-critical, the data read from the memory location will not be used in an operation that effects the state of thread 300 (and/or the program code). Further exposure to soft errors therefore does not occur, despite the read of the memory location. For this reason, processor core 102 does not update last-accessed counter 308. At time 5, thread 302 executes an instruction that causes an operation that is not relevant for determining the exposure of the program code to soft errors.

At time 6, thread 302 executes an instruction that causes a critical read 322 from the memory location. Because the read is critical, the data read from the memory location will be used in an operation that effects the state of thread 302 (and thus the program code). In some embodiments, processor core 102 earlier identified this instruction, so, upon executing the instruction, processor core 102 recognizes the instruction as one that performs a critical read. Upon recognizing the further exposure to soft errors, processor core 102 increments vulnerability counter 310 with an amount of time of the further exposure to the soft errors. To compute this time, processor core 102 subtracts the value of last-accessed counter 308 (4) from time counter 306 (6) to compute the amount of time of the further exposure to soft errors (2). Processor core 102 then increments vulnerability counter 310 from 3 by the amount of time of the exposure to soft errors, 2—making the vulnerability counter 310 equal to 5. Next, processor core 102 updates last-accessed counter 308 to 6, thereby arriving at the updated state for the counters shown at time 4 of FIG. 3. Note that, after the updates associated with time 4, vulnerability counter 310 holds a value of 5, which reflects (so far) the total exposure to soft errors. At time 6, thread 300 executes an instruction that causes an operation that is not relevant for determining the exposure of the program code to soft errors.

At time 7, both thread 300 and thread 302 execute corresponding instructions that cause operations that are not relevant for determining the exposure of the program code to soft errors. Note, however, that processor core 102 maintains the value of vulnerability counter 310 and last-accessed counter 308, thereby maintaining an accurate indicator of the program code's exposure to soft errors so far.

At time 8, thread 302 executes an instruction that causes a write 324, during which data is written to the memory location. Upon the write of data to the memory location, the exposure of the program code to soft errors due to write 312 ends (because the corresponding data is no longer held in the memory location). This means that the value of vulnerability counter with regard to write 312 has reached its final value (and will no longer be incremented based on exposure to soft errors from write 312). Note, however, that, upon write 324, the program code is again potentially exposed to soft errors from time 9 onward—although the example in FIG. 3 ends at time 8. At time 8, thread 302 executes an instruction that causes an operation that is not relevant for determining the exposure of the program code to soft errors.

As can be seen in FIG. 3, the final value of vulnerability counter 310 is 5. Given that the final time was 8 (when write 324 occurred), the program code is vulnerable to soft errors for $5/7$ of the time, or approximately 71% of the time. This vulnerability could be reduced by reducing the number of critical reads, moving critical reads (e.g., during a programming or compilation operation) to be closer to write 312 (thereby shortening the time for which the data is exposed to soft errors in the memory location), moving write 312, etc.

In addition, as shown in FIG. 3, the program code's exposure to soft errors is caused by instructions executed by both thread 300 and thread 302. The described embodiments are able to determine an appropriate value for vulnerability counter 310, despite the critical accesses by both threads. In contrast, existing program code testing mechanisms that determine the vulnerability of only individual threads would not have been able to determine an appropriate value for vulnerability counter 310.

In some embodiments, a computing device (e.g., computing device 100 in FIG. 1 and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits, elements, devices, mechanisms, etc. that perform corresponding operations. In some embodiments, functional blocks execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for determining a vulnerability of multi-threaded program code to soft errors, comprising:
    by a computing device, performing operations for:
        analyzing instructions for each of two or more threads in the program code to identify particular instructions from the two or more threads that perform predetermined accesses of one or more architectural structures;
        while executing instructions from the program code, monitoring the executing to determine when the particular instructions are executed and therefore when corresponding predetermined accesses are performed;
        determining a time for which the program code is exposed to soft errors based on a timing of the corresponding predetermined accesses by determining an amount of time when data is held in at least one of the one or more architectural structures, the data to be used for performing corresponding predetermined accesses for at least one of the particular instructions, the determining the amount of time comprising, for each of the one or more architectural structures, maintaining a corresponding vulnerability counter, a value in the vulnerability counter set using a time counter and a last-accessed counter, the last accessed counter being updated when corresponding predetermined accesses of the architectural structure occur; and
        using the time for which the program code is exposed to soft errors to determine the vulnerability of the program code to soft errors.

2. The method of claim 1, wherein a predetermined access of the one or more architectural structures comprises:
    acquiring data from at least one of the one or more architectural structures; and
    using the acquired data to perform an operation, the operation effecting a state of at least one of a corresponding thread or the program code.

3. The method of claim 1, wherein using the time for which the program code is exposed to soft errors to determine the vulnerability of the program code to soft errors comprises:
    by the computing device, performing operations for:
        computing the vulnerability for the program code to soft errors as a ratio of the amount of time when data is held in at least one of the one or more architectural structures to an overall execution time for the program code.

4. The method of claim 1, wherein each of the one or more architectural structures comprises a corresponding structure defined in an instruction set architecture (ISA) for which the program code is written.

5. The method of claim 1, wherein analyzing the instructions for each of the two or more threads in the program code to identify the particular instructions in the two or more threads that perform the predetermined accesses of the one or more architectural structures comprises:
    by the computing device, performing operations for:
        statically analyzing instructions for each of the two or more threads in the program code.

6. A computing device that determines a vulnerability of multi-threaded program code to soft errors, comprising:
    at least one processor core; and
    a memory;
    wherein the at least one processor core and the memory are configured to perform operations for:
        analyzing instructions for each of two or more threads in the program code to identify particular instructions from the two or more threads that perform predetermined accesses of one or more architectural structures;
        while executing instructions from the program code, monitoring the executing to determine when the particular instructions are executed and therefore when corresponding predetermined accesses are performed;
        determining a time for which the program code is exposed to soft errors based on a timing of the corresponding predetermined accesses by determining an amount of time when data is held in at least one of the one or more architectural structures, the data to be used for performing corresponding predetermined accesses for at least one of the particular instructions, the determining the amount of time comprising, for each of the one or more architectural structures, maintaining a corresponding vulnerability counter, a value in the vulnerability counter set using a time counter and a last-accessed counter, the last accessed counter being updated when corresponding predetermined accesses of the architectural structure occur; and
        using the time for which the program code is exposed to soft errors to determine the vulnerability of the program code to soft errors.

7. The computing device of claim 6, wherein a predetermined access of the one or more architectural structures comprises:
    acquiring data from at least one of the one or more architectural structures; and
    using the acquired data to perform an operation, the operation effecting a state of at least one of a corresponding thread or the program code.

8. The computing device of claim 6, wherein, when using the time for which the program code is exposed to soft errors to determine the vulnerability of the program code to soft errors, the at least one processor core and the memory are configured to perform operations for:

computing the vulnerability for the program code to soft errors as a ratio of the amount of time when data is held in at least one of the one or more architectural structures to an overall execution time for the program code.

9. The computing device of claim 6, each of the one or more architectural structures comprises a corresponding structure defined in an instruction set architecture (ISA) for which the program code is written.

10. The computing device of claim 6, wherein, when analyzing the instructions for each of the two or more threads in the program code to identify the particular instructions in the two or more threads that perform the predetermined accesses of the one or more architectural structures, the at least one processor core and the memory are configured to perform operations for:
   statically analyzing instructions for each of the two or more threads in the program code.

11. A non-transitory computer-readable storage medium storing program code that, when executed by a computing device, causes the computing device to perform operations for determining a vulnerability of multi-threaded program code to soft errors, the operations comprising:
   analyzing instructions for each of two or more threads in the program code to identify particular instructions from the two or more threads that perform predetermined accesses of one or more architectural structures;
   while executing instructions from the program code, monitoring the executing to determine when the particular instructions are executed and therefore when corresponding predetermined accesses are performed;
   determining a time for which the program code is exposed to soft errors based on a timing of the corresponding predetermined accesses by determining an amount of time when data is held in at least one of the one or more architectural structures, the data to be used for performing corresponding predetermined accesses for at least one of the particular instructions, the determining the amount of time comprising, for each of the one or more architectural structures, maintaining a corresponding vulnerability counter, a value in the vulnerability counter set using a time counter and a last-accessed counter, the last accessed counter being updated when corresponding predetermined accesses of the architectural structure occur; and
   using the time for which the program code is exposed to soft errors to determine the vulnerability of the program code to soft errors.

12. The non-transitory computer-readable storage medium of claim 11, wherein a predetermined access of the one or more architectural structures comprises:
   acquiring data from at least one of the one or more architectural structures; and
   using the acquired data to perform an operation, the operation effecting a state of at least one of a corresponding thread or the program code.

13. The non-transitory computer-readable storage medium of claim 11, wherein using the time for which the program code is exposed to soft errors to determine the vulnerability of the program code to soft errors comprises:
   computing the vulnerability for the program code to soft errors as a ratio of the amount of time when data is held in at least one of the one or more architectural structures to an overall execution time for the program code.

14. The non-transitory computer-readable storage medium of claim 11, each of the one or more architectural structures comprises a corresponding structure defined in an instruction set architecture (ISA) for which the program code is written.

* * * * *